United States Patent
Hile

(10) Patent No.: US 6,574,828 B2
(45) Date of Patent: Jun. 10, 2003

(54) COMBINATION LAWN CARE SWEEPER THATCHER SHREDDER

(76) Inventor: Jeffrey B. Hile, 719 Wexford-Bayne Rd., Wexford, PA (US) 15090

( * ) Notice: Subject to any disclaimer, the term of this patent is extended or adjusted under 35 U.S.C. 154(b) by 0 days.

(21) Appl. No.: 09/971,382

(22) Filed: Oct. 5, 2001

(65) Prior Publication Data

US 2003/0066278 A1 Apr. 10, 2003

(51) Int. Cl.$^7$ ................................................ A47L 7/02
(52) U.S. Cl. ........................ 15/340.4; 15/384; 15/354
(58) Field of Search ............................. 15/340.3, 340.4, 15/384, 82, 83, 52.1, 79.2, 354; 56/12.6, 12.9

(56) References Cited

U.S. PATENT DOCUMENTS

| | | | |
|---|---|---|---|
| 2,661,584 A | * 12/1953 | Ronning | 56/501 |
| 3,406,424 A | * 10/1968 | Rush | 15/340.3 |
| 3,409,933 A | * 11/1968 | Larsson | 15/364 |
| 3,594,848 A | * 7/1971 | Atkinson | 15/314 |
| 3,624,861 A | * 12/1971 | Freiheit | 15/320 |
| 3,822,436 A | * 7/1974 | Burgoon | 15/354 |
| 3,859,777 A | * 1/1975 | Doering | 56/16.7 |
| 3,995,415 A | * 12/1976 | Hoffmann | 56/364 |
| 4,151,701 A | * 5/1979 | Marto | 56/16.1 |
| 4,366,593 A | * 1/1983 | Parikh | 15/52.1 |
| 4,426,751 A | * 1/1984 | Nordeen | 15/384 |
| 4,654,927 A | * 4/1987 | Novinger | 15/340.2 |
| 5,134,838 A | * 8/1992 | Swisher et al. | 56/16.6 |
| 5,435,118 A | * 7/1995 | Cobile | 56/13.4 |
| 5,718,017 A | * 2/1998 | Pavlick | 15/340.1 |
| 5,813,086 A | * 9/1998 | Ueno et al. | 15/384 |
| 6,030,465 A | * 2/2000 | Marcussen et al. | 15/384 |
| 6,237,695 B1 | * 5/2001 | Pierce et al. | 56/16.7 |

* cited by examiner

*Primary Examiner*—Theresa T. Snider
(74) *Attorney, Agent, or Firm*—Carothers & Carothers

(57) ABSTRACT

A mobile sweeper having a wheel supported housing to be moved forward and backward over a surface to be swept of debris. A pair of parallel elongated rotary brushes are mounted in the housing for rotation and extend in the direction of their elongation transversely to the direction of normal forward movement of the housing. These rotating brushes project downwardly through a bottom opening in the housing for sweeping an underlying surface of leaves and other debris. The drive for the brushes drives the rotary brushes in counter rotation whereby debris is swept upwardly between the brushes. A vacuum shredder fan is also mounted in the housing and communicates through a vacuum chute with the bottom opening of the housing for drawing in debris swept up by the brushes and chipping, shredding or mulching and discharging the shredded debris through a discharge chute for collection. A damper valve plate is disposed in this vacuum chute between the brushes and the shredder fan and is operable for closing off the vacuum chute whereby a vacuum port positioned on the vacuum chute between the damper valve plate and the shredder fan is provided for connecting a vacuum conduit, such as a vacuum hose or vacuum funnel chute, to the port for vacuum communication with the shredder fan.

8 Claims, 14 Drawing Sheets

COMBINATION LAWN CARE SWEEPER THATCHER SHREDDER

BACKGROUND OF THE INVENTION

This invention relates generally to yard or lawn machines. More particularly, this invention relates to a combination lawn care mobile machine which can sweep, vacuum, thatch and shred.

Typical lawn brooms include a rotary drum having a plurality of rows of bristles secured thereto which sweep the surface to be cleaned upon rotation. In addition to lawn sweepers for sweeping up leaves and other debris, many other yard machines have been developed over the years, such as, mowers, vacuums, blowers, shredders, chippers and trimmers.

It is a principal object of the present invention to provide a lawn sweeper which is more efficient than those of the prior art and which also has incorporated into the machine additional features for vacuuming, shredding, chipping, and thatching.

SUMMARY OF THE INVENTION

The mobile sweeper apparatus of the present invention is comprised of a wheel supported housing to be moved over an underlying surface to be swept of debris, and which housing is also provided with a bottom opening. A rotary brush mechanism is mounted in the housing and projects through the bottom opening of the housing for sweeping up debris from an underlying surface and a drive mechanism is connected for rotatably driving the brush mechanism. In addition, a vacuum fan with shredder impellers is mounted in the housing and communicates through a vacuum chute with the bottom opening of the housing for drawing in, shredding or chipping and discharging debris swept up by the brush mechanism.

A damper valve dam or plate is disposed in this vacuum chute between the brush mechanism and the shredder fan and is operable for closing off the vacuum chute. Also, a normally close vacuum port is positioned on the vacuum chute between the damper valve plate and the shredder fan for connecting a vacuum conduit to this port for vacuum communication with the fan for thereby converting the mobile apparatus to a vacuum device. This vacuum conduit may be in the form of a vacuum hose for vacuuming up leaves or other debris, or the vacuum conduit may be in the form of a funnel chute for inserting debris to be shred or chipped by the shredder fan.

The brush mechanism is preferably provided in the form of a pair of substantially parallel elongated rotary brushes mounted in the housing for rotation about their axis which extend in the direction of their elongation, and which is transverse to the direction of normal forward movement of the housing. These brushes project through the bottom opening of the housing for sweeping the underlying surface and the brushes are driven in counter rotation whereby the debris being swept is swept upwardly between the brushes to provide a more efficient sweeping action. The rotary brushes may have radially extending bristles which may intermesh with bristles of the adjacent parallel rotary brush for even more efficient sweeping action. In yet another form the intermeshing bristles of the elongated brushes may be comprised of elongate bristle paddle type sweeper blades.

The mobile sweeper apparatus of the present invention may be self propelled or may include attachment mechanism for attaching the housing of the apparatus to a motorized vehicle, such as a lawn tractor, for moving the housing. This drive mechanism further includes a powered takeoff to drive the brush mechanism and shredder fan. The power takeoff may be from a lawn tractor in the form of a belt drive with a spring loaded belt tension pulley for easy connection of the apparatus to the take-off drive of the motorized vehicle.

The rotary brushes of the mobile sweeper apparatus of the present invention can be readily exchanged in whole or in part with radially extending wire tines for thatching a lawn. In addition, the height of the housing for the apparatus may be adjusted above the underlying surface to be swept or thatched to the appropriate height as required for the conditions.

BRIEF DESCRIPTION OF THE DRAWINGS

Other objects and advantages appear hereinafter in the following description and claims. The accompanying drawings show, for the purpose of exemplification, without limiting the invention or appended claims, certain practical embodiments of the present invention wherein:

DETAILED DESCRIPTION OF PREFERRED EMBODIMENTS

Figure 1:
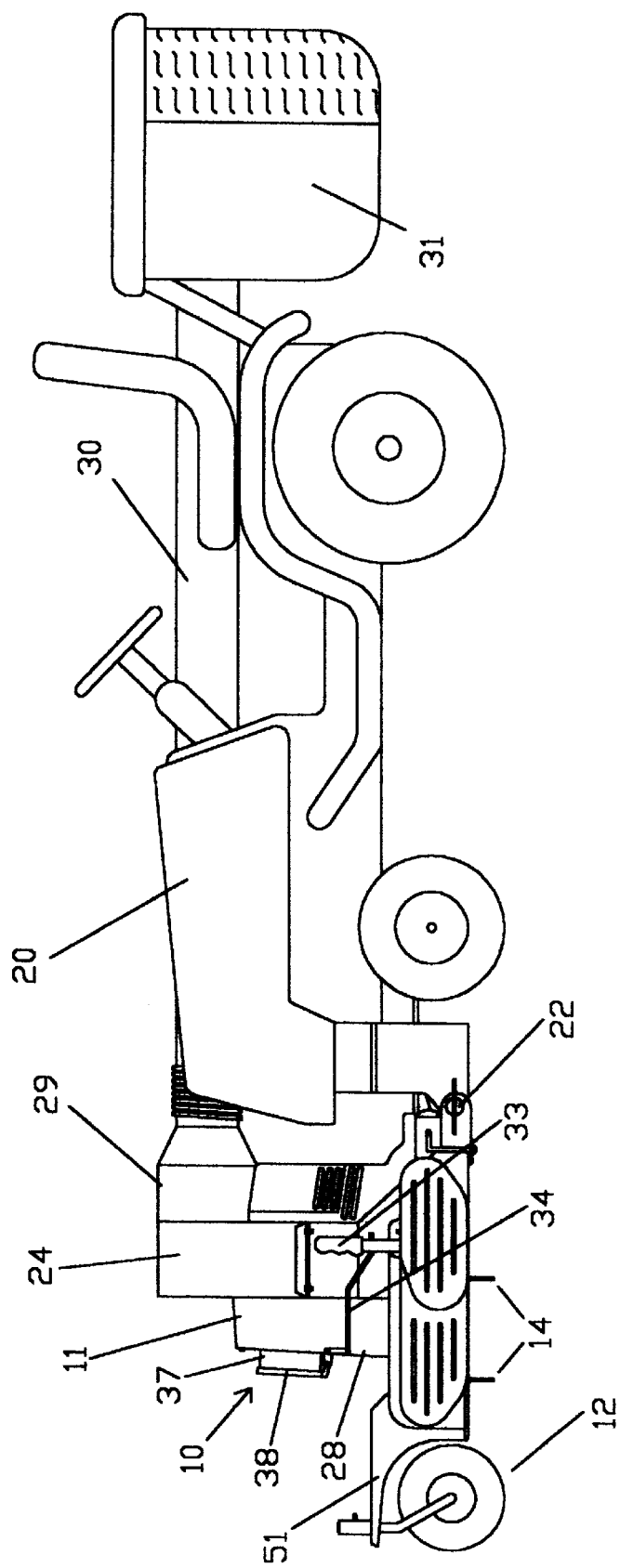
FIG. 1 is a view in left side elevation of the mobile sweeper apparatus of the present invention attached to the forward end of a lawn tractor.
Figure 2:
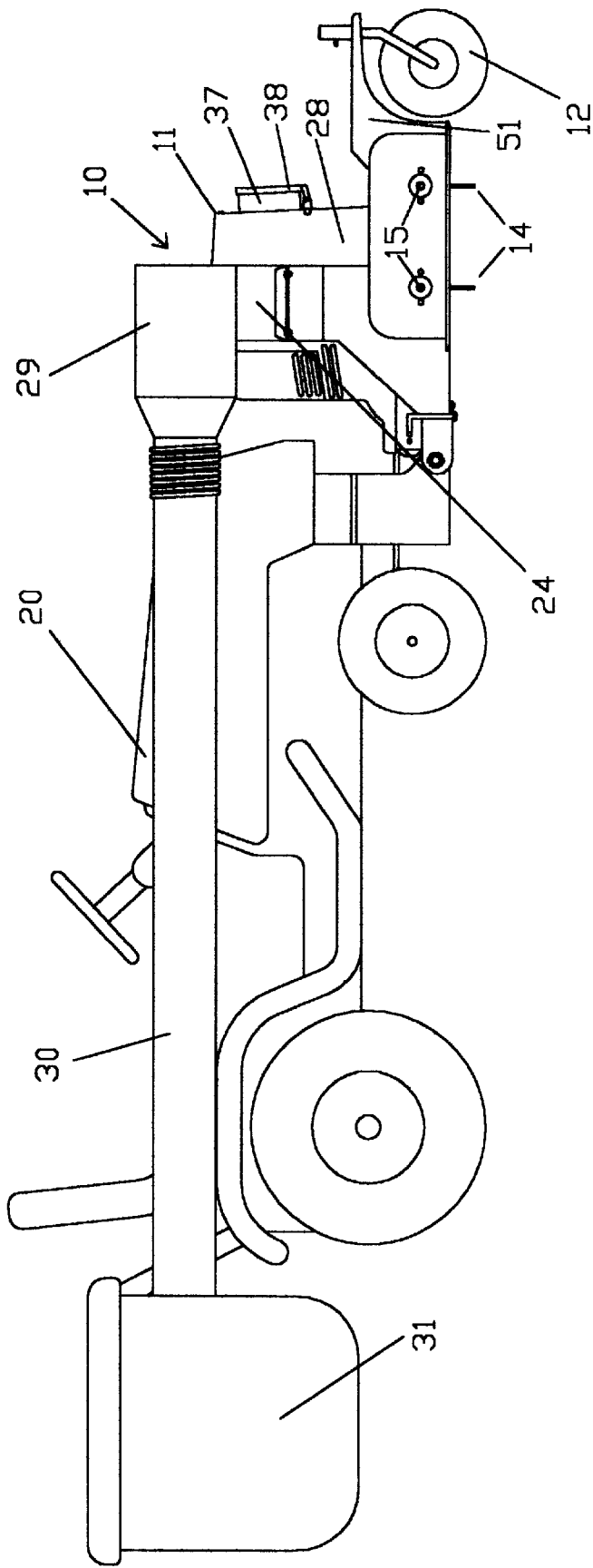
FIG. 2 is a view in right side elevation of the apparatus shown in FIG. 1.
Figure 3:
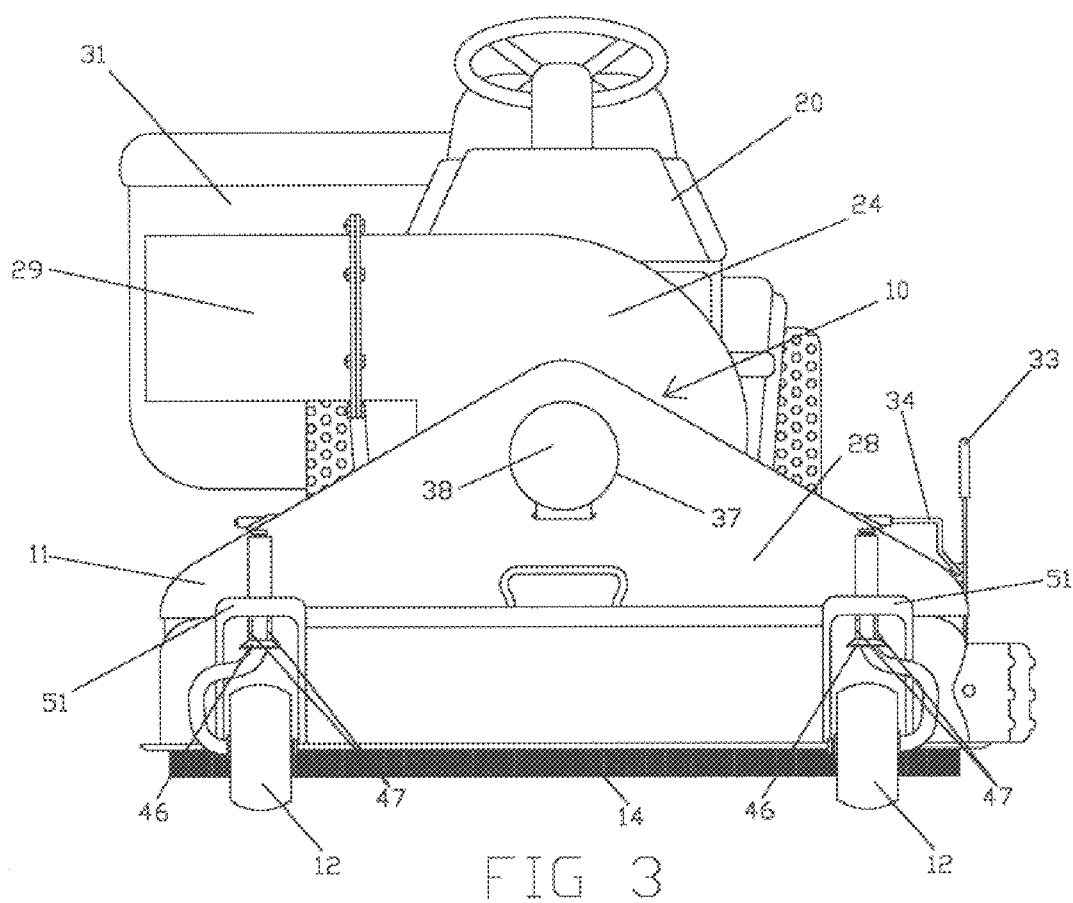
FIG. 3 is an enlarged view in front elevation of the apparatus shown in FIGS. 1 and 2.
Figure 4:
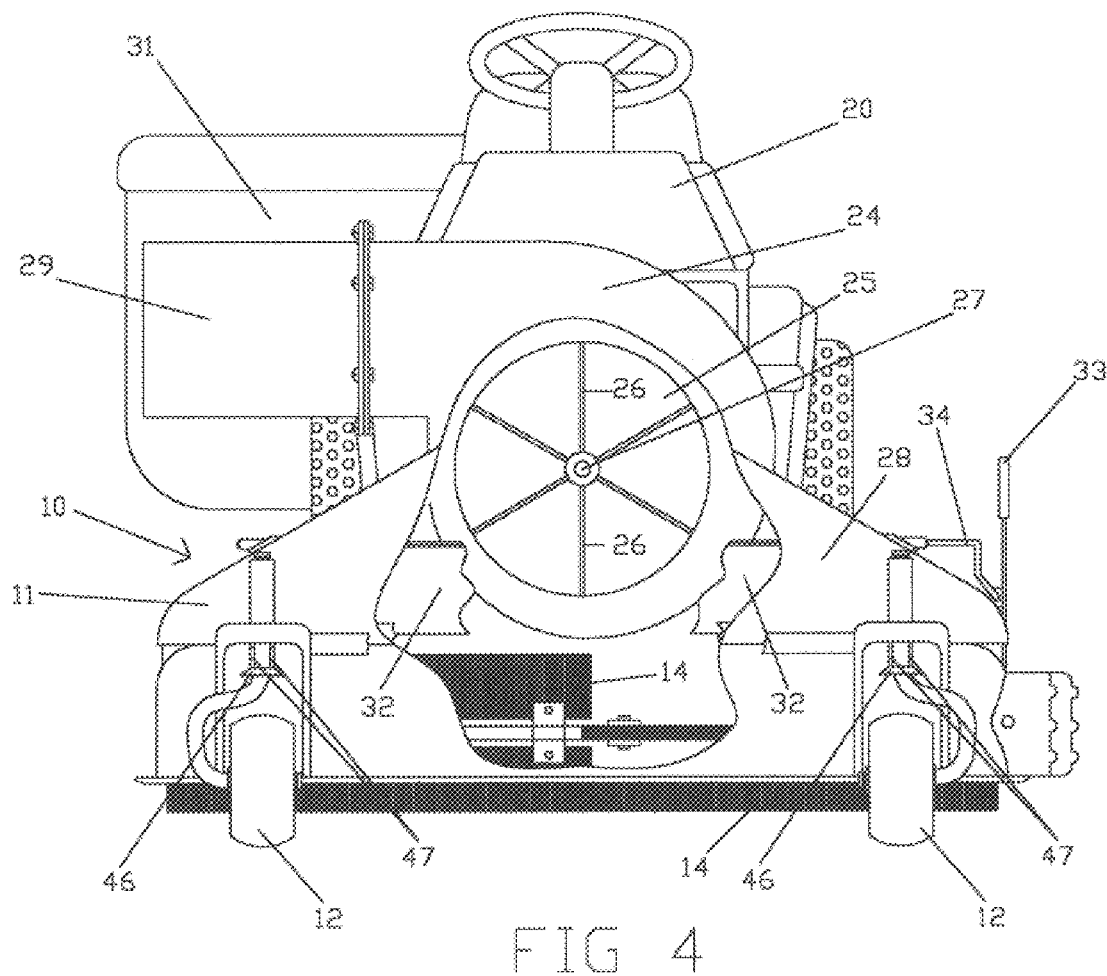
FIG. 4 is a view in front elevation of the apparatus as shown in FIG. 3 with portions removed to disclose internal components.
Figure 5:
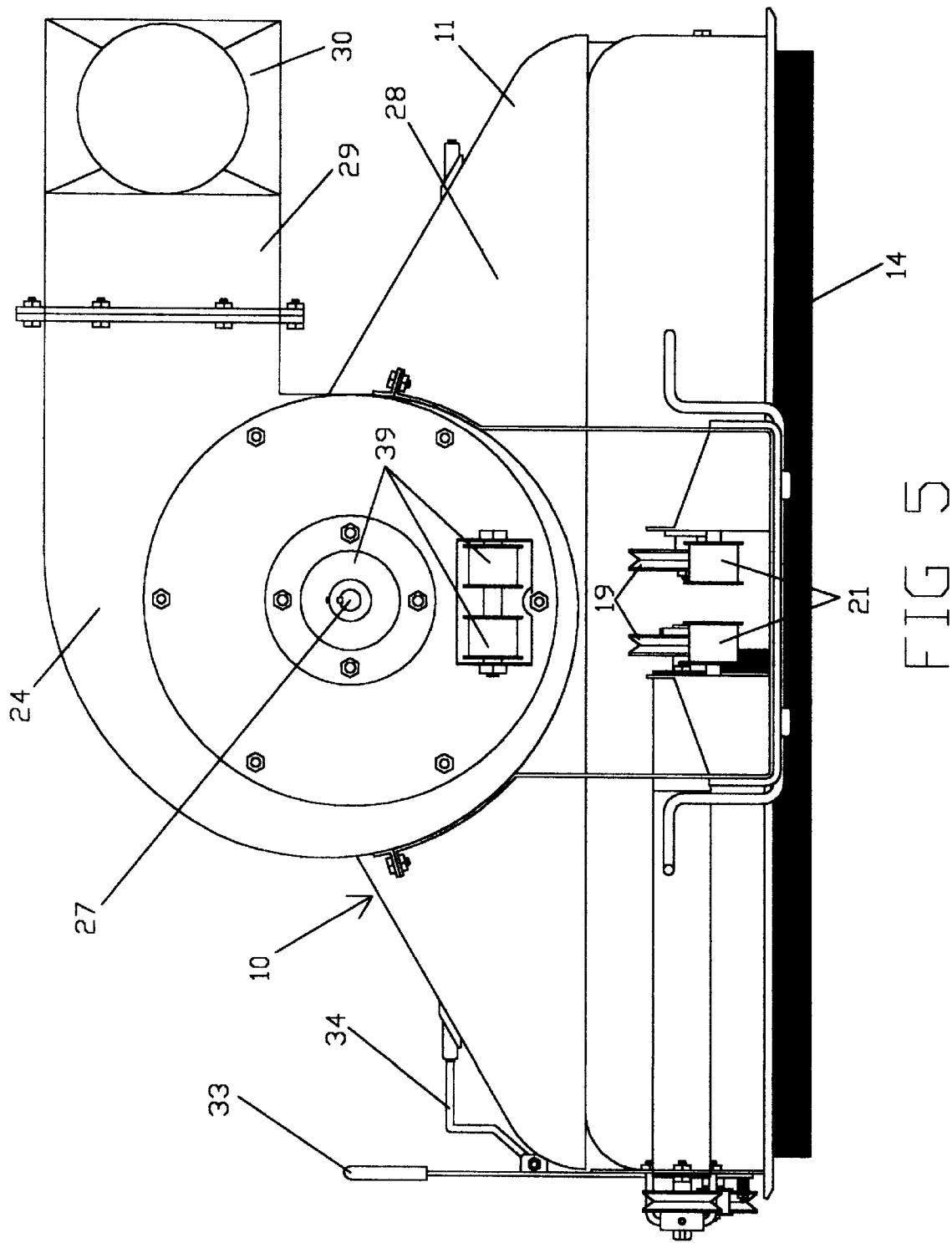
FIG. 5 is an enlarged view in rear elevation of the mobile sweeper apparatus of the present invention shown in the previous figures with the belt cover removed and without the attachment of the lawn tractor.
Figure 6:
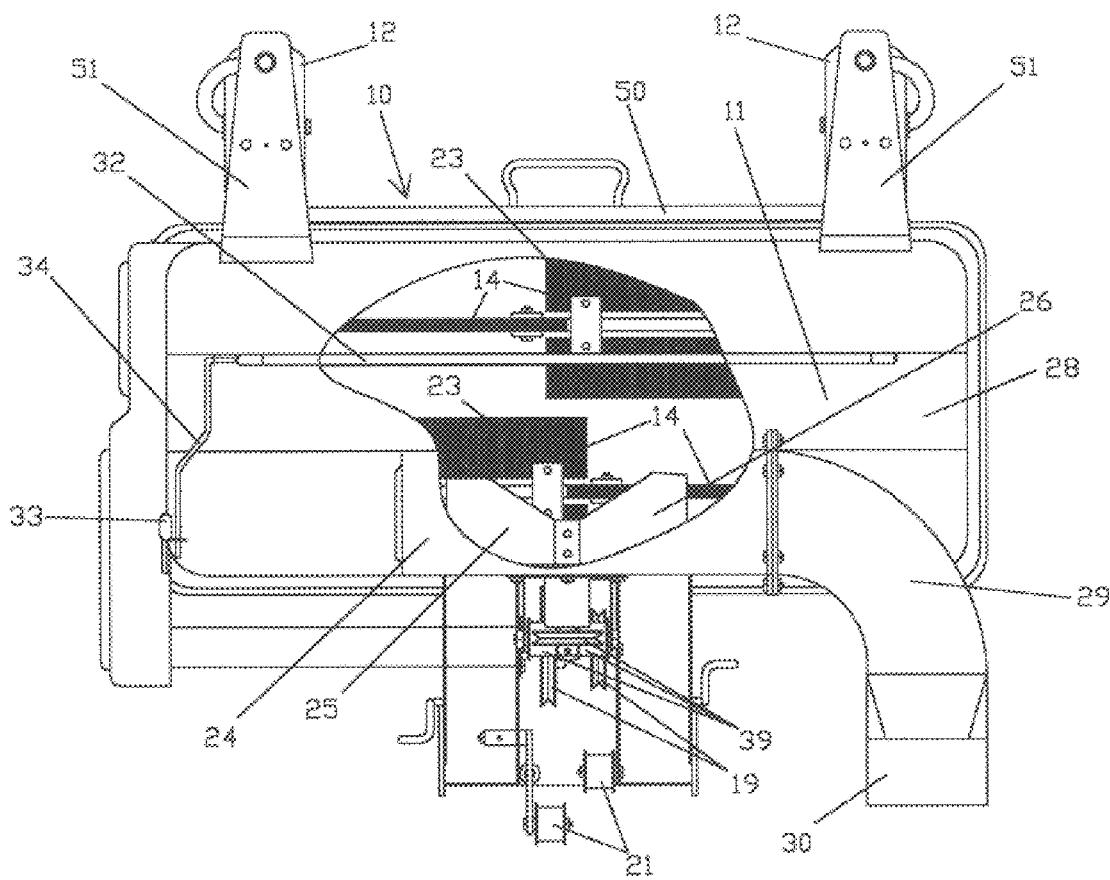
FIG. 6 is a top or plan view of the apparatus illustrated in FIG. 5 with central portions and the belt cover removed to disclose interior components, including the damper valve plate shown in an open condition.
Figure 7:
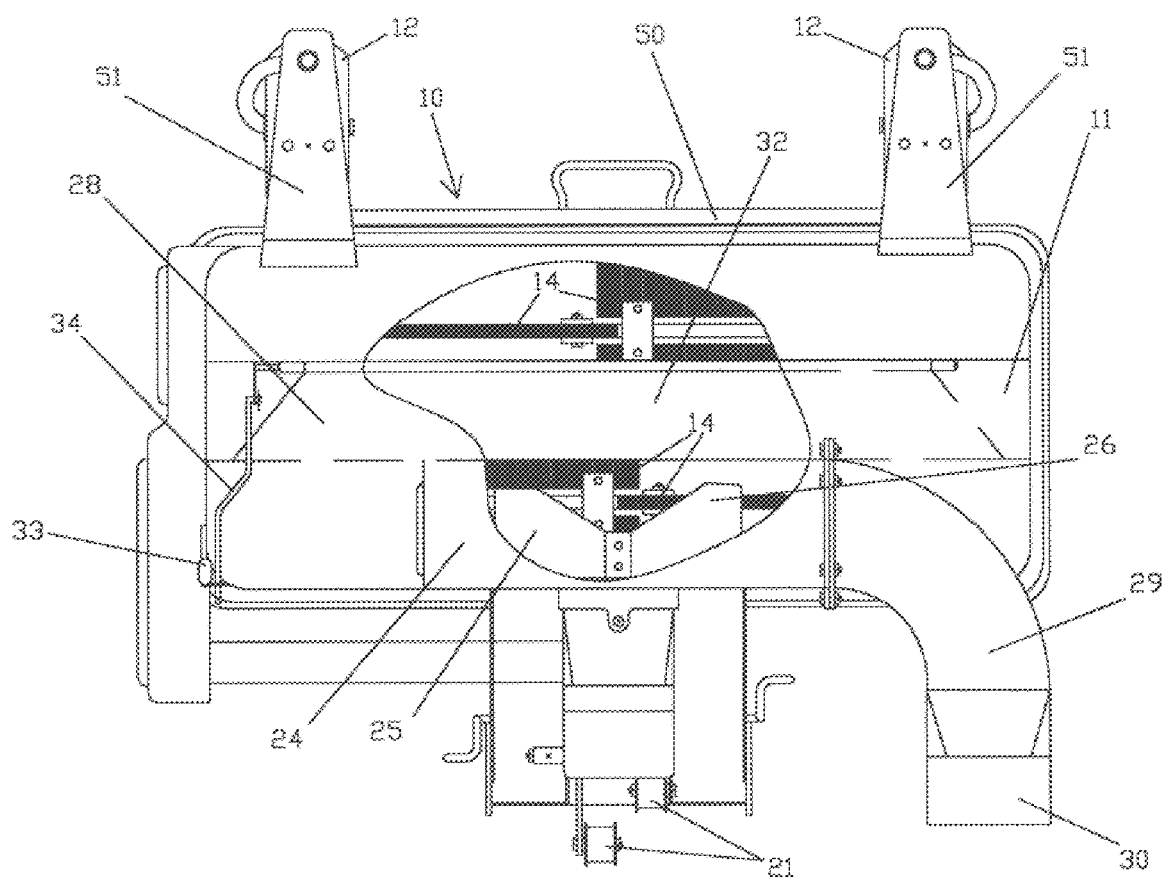
FIG. 7 is a top view of the mobile sweeper apparatus of the present invention of FIG. 5 as shown with central portions removed to reveal the interior thereof as in FIG. 6, but illustrating the damper valve plate in a closed position.
Figure 8:
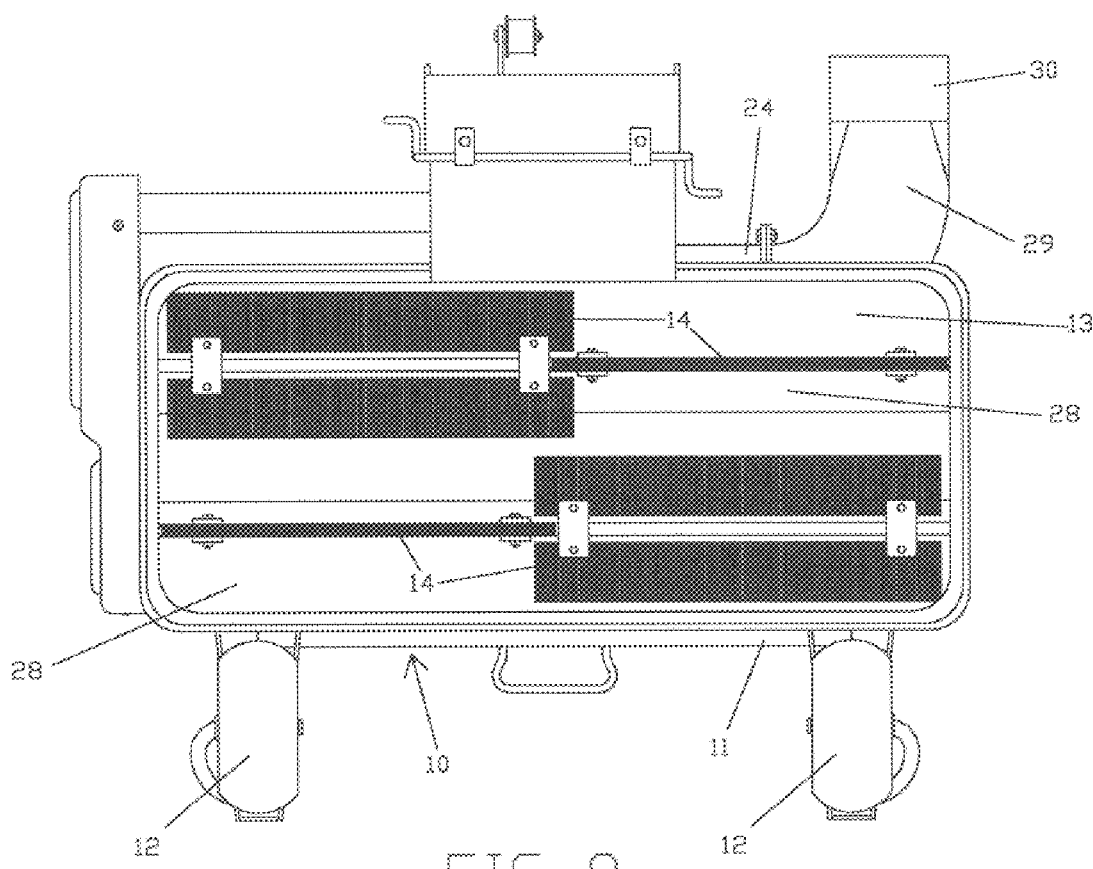
FIG. 8 is a bottom view of the mobile sweeper apparatus of the present invention illustrated in FIGS. 5 through 7 exposing the rotary brush mechanism.

Referring first to FIGS. 1 through 8, the mobile sweeper apparatus 10 of the present invention includes a housing 11 supported on wheels 12 for forward and rearward movement over an underlying surface to be swept of debris. The housing 11 is provided with a bottom opening 13 which is best illustrated in FIG. 8.

A pair of substantially parallel elongated rotary brushes 14 are mounted in housing 11 for rotation about axis 15 extending in the direction of their elongation and transverse to the direction of normal forward movement of housing 11. Brushes 14 has been inserted before 'project' project through the bottom opening 13 of housing 11 for sweeping an underlying surface. A drive mechanism 16, partially illustrated in FIGS. 10 and 11 in the form of a belt drive, is utilized to drive brushes 14 in counter rotation as indicated by arrows 17 in FIG. 10 whereby debris is swept upwardly between brushes 14 as indicated by arrow 18 in FIG. 10. This drive mechanism 16 is ultimately driven from a primary belt drive on pulleys 19, which primary belt drive connects to a power takeoff (not shown) on motorized vehicle or lawn tractor 20 via idler tension pulley 21. Mobile sweeper apparatus 10 is coupled for driving to the forward end of lawn tractor 20 via conventional pin coupling 22. Rotary brushes 14 have radially extending bristles 23 provided in the form of elongate bristle paddle type sweeper blades.

A vacuum shredder fan 24 having a rotating mulching/shredding impeller 25 is provided with shredder blades 26. Impeller 25 axially rotates about its center axis 27 and is belt driven off of pulleys 19 and 39.

Shredder fan 25 operates to vacuum in debris swept up from between rotary brushes 14 through vacuum chute 28 into shredder fan 24 thereby causing the debris, such as, sticks and leaves, to be mulched and/or shredded and discharged therefrom through discharge chute 29 through conduit 30 to rear discharge container 31 for collection.

Figure 10:
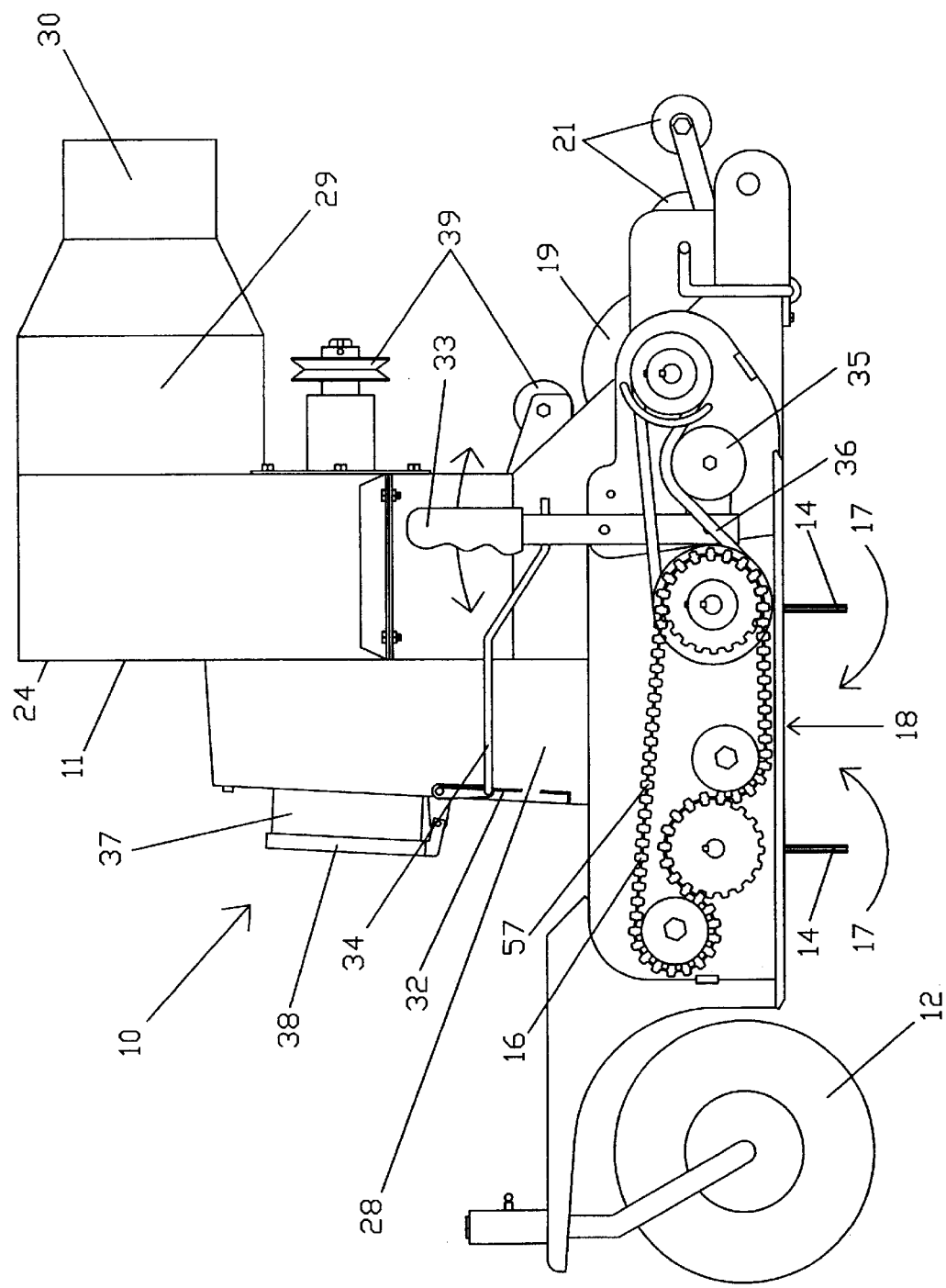
FIG. 10 is an enlarged view in left side elevation of the mobile sweeper apparatus of the present invention as previously illustrated in FIG. 1 but shown unattached to the lawn tractor and with its side cover plate removed to expose the interior drive mechanism.
Figure 11:
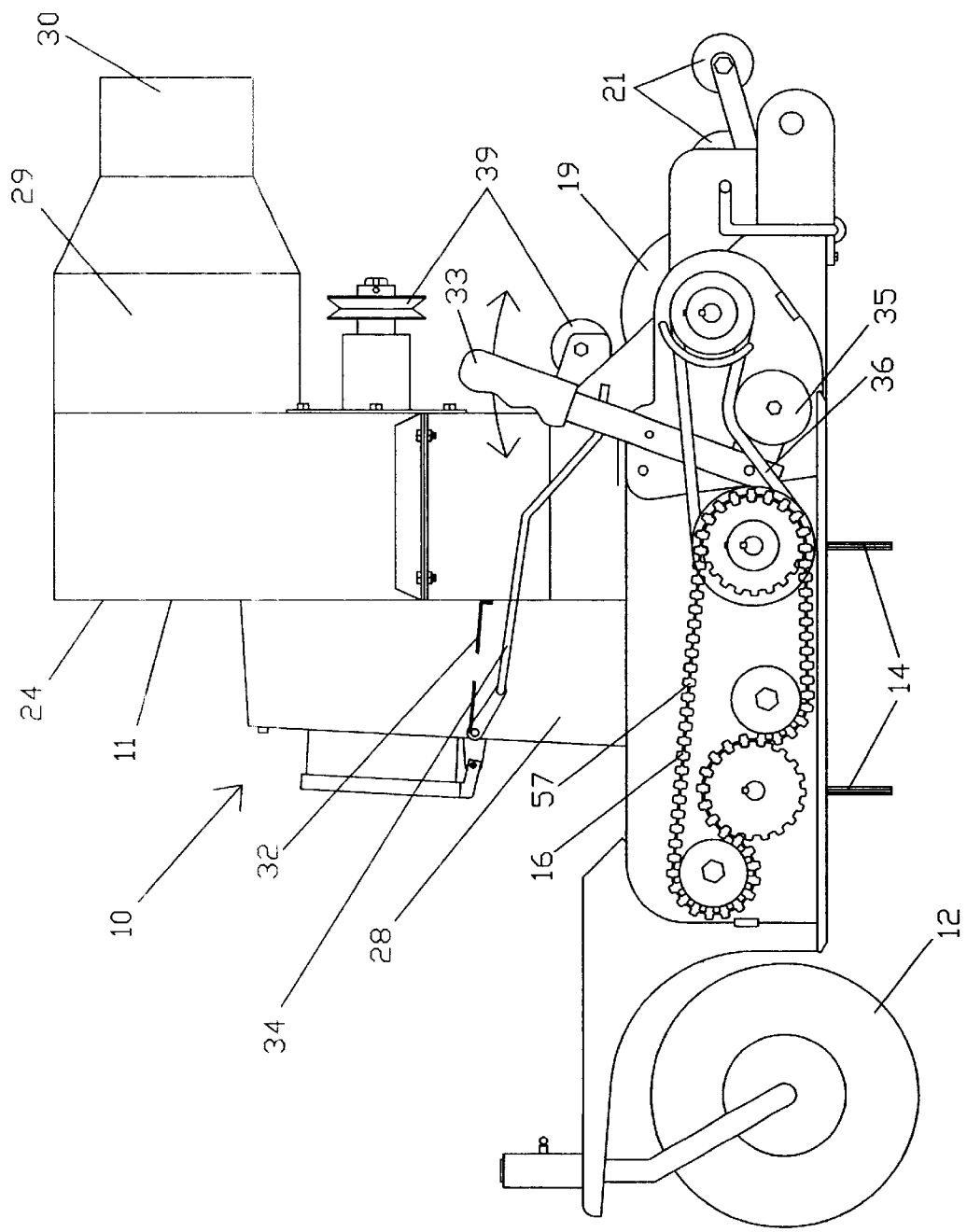
FIG. 11 is an enlarged view in left side elevation showing the same exposure of FIG. 10 with the exception that FIG. 10 illustrates the structure with the brush mechanism engaged and the vacuum valve plate open and the structure of FIG. 11 illustrates the brush mechanism as being disengaged and the vacuum valve plate or dam closed for utilizing the apparatus of the present invention solely as a vacuum shredder or mulching device.

With particular reference to FIGS. 4, 6, 7, 10 and 11, a damper valve dam or plate 32 is disposed in vacuum chute 28 between brushes 14 and shredder fan 24 and is operable for closing off vacuum chute 28 by means of operating lever arm 33. The operation of lever arm 33 is best illustrated in FIGS. 10 and 11. When lever arm 33 is moved to its most forward position as shown in FIG. 10, damper valve plate 32 is forced into its open position as shown in FIG. 10 by connecting rod 34. In this position, lever arm 33 also engages idler pulley 35, which is a belt tensioning pulley, against belt 36 which causes belt 57 to drive rotary brushes 14 as previously described. When lever arm 33 is in its rearward most position as indicated in FIG. 11, damper valve plate 32 is forced to its closed position as shown in FIG. 11 whereby vacuum chute 28 is closed off and the drive mechanism 16 for brushes 14 is also disengaged so that brushes 14 no longer rotate.

Figure 12:
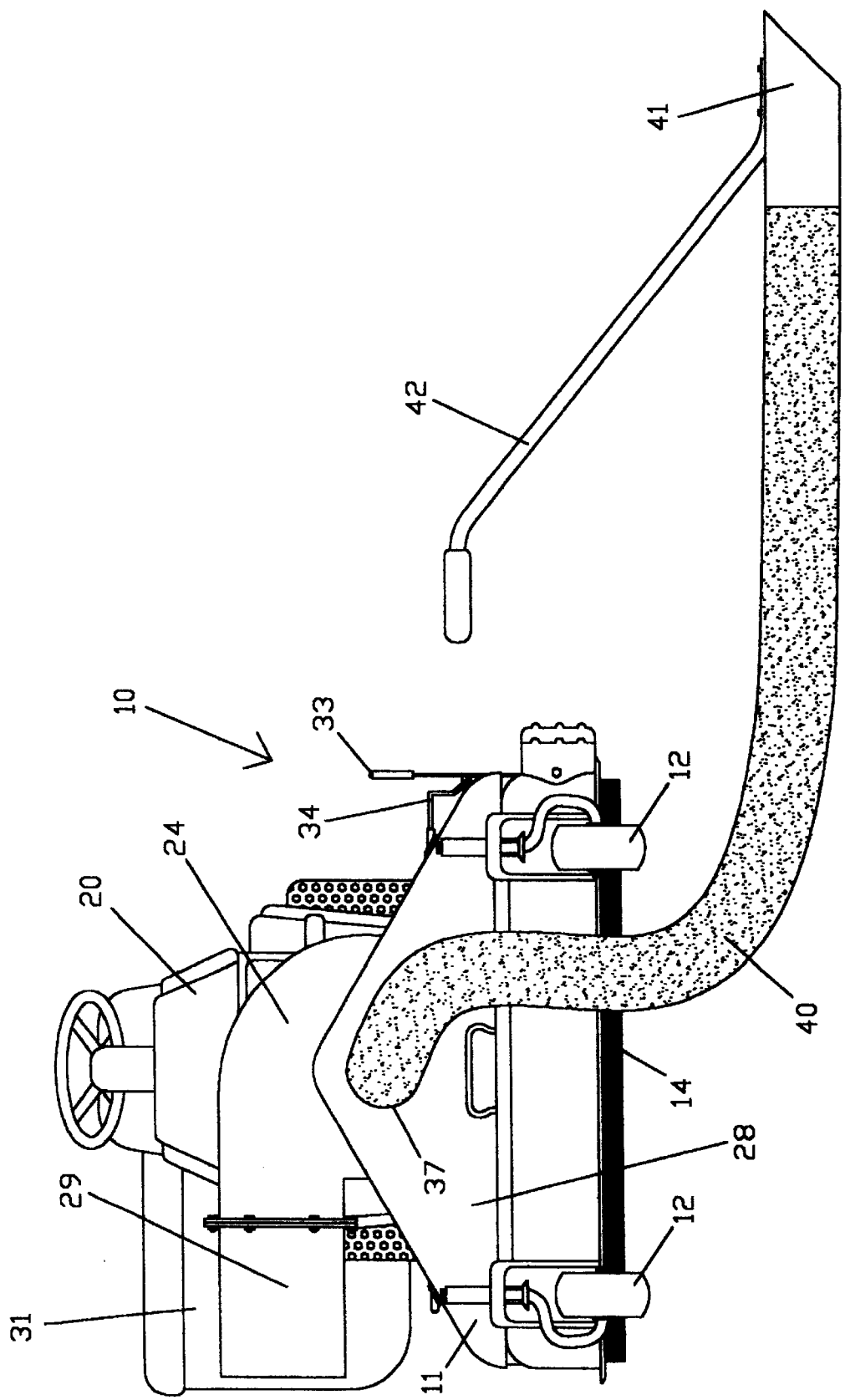
FIG. 12 is a view in front elevation of the apparatus illustrated in FIGS. 1 through 3 with a vacuum hose attached to the forward end thereof for vacuuming up debris.

Vacuum port 37 is positioned on vacuum chute 28 between damper valve plate 32 and shredder fan 24 and is provided with a spring loaded cover 38 which is normally closed and may be open for connecting port 37 to a vacuum conduit for vacuum communication with shredder fan 24. As is illustrated in FIG. 12, the vacuum conduit is here provided in the form of a vacuum hose 40 which is connected to port 37 and is further provided at its distal end with a vacuum nozzle 41 for vacuuming debris such as leaves. In order to easily manipulate nozzle 41, it is provided with a handle 42.

Figure 13:
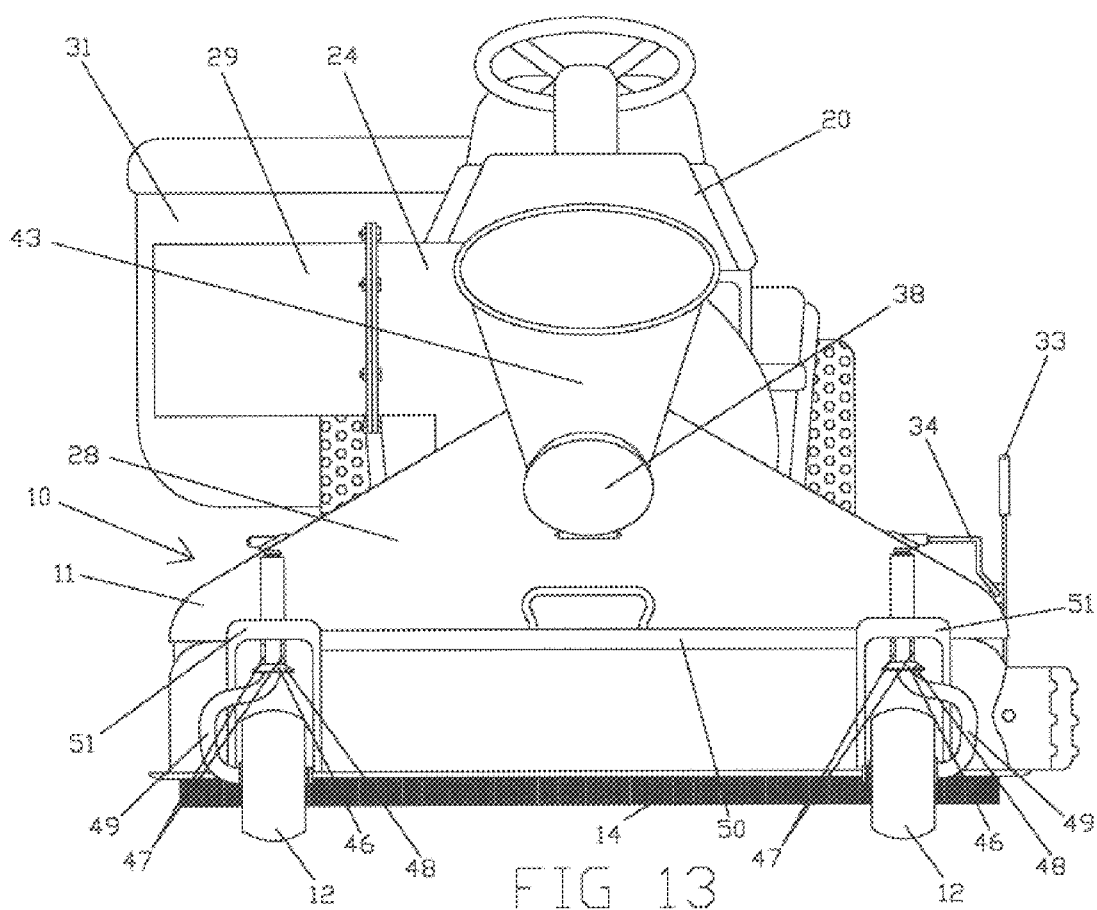
FIG. 13 is a view in front elevation of the mobile sweeper apparatus of the present invention as originally disclosed in FIGS. 1 through 3 with a funnel chute attached to the forward end of the housing for inserting debris to be chipped, shredded or mulched.

Referring next to FIG. 13, the vacuum conduit is shown as funnel chute 43, in which debris such as sticks and leaves may be inserted to be chipped, shredded and/or mulched in shredder fan 25 and then discharged on to container 31 for collection and disposal.

Figure 9:
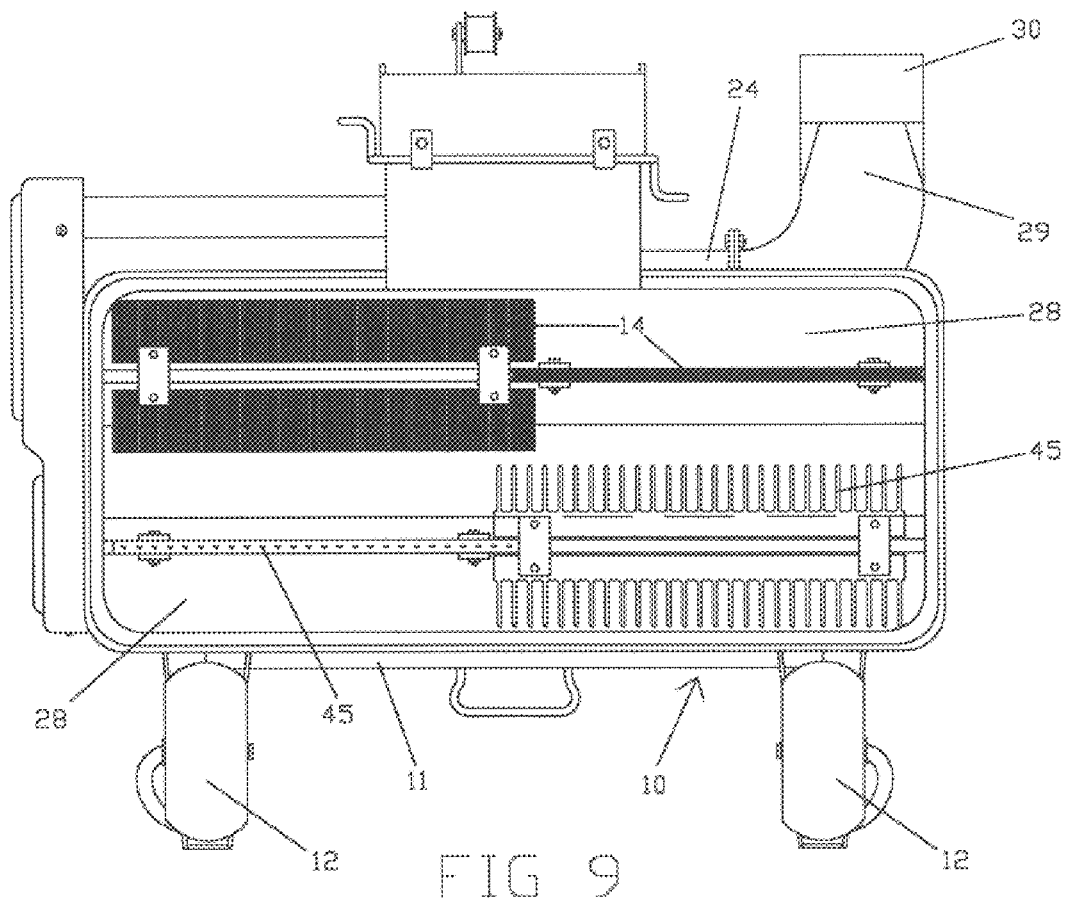
FIG. 9 is a bottom view of the apparatus of the present invention as previously shown in FIGS. 5 through 7 illustrating a modification of the rotary brush mechanism wherein portions of the rotary brushes have been substituted with rotary wire thatching tines.

Also, one or both, or portions of one of the rotary brushes 14 may be substituted with radially extending wire tines 45 as illustrated in FIG. 9 for thatching a lawn.

In addition, the housing 11 includes height adjustment mechanism 46 for adjusting the height of the housing 11 above the underlying surface by raising the housing 11 or lowering the housing 11 relative to wheels 12. The raising or lowering of the housing 11 is accomplished with lever arm 50 seen in FIGS. 13 and 14. FIG. 13 shows the housing 11 in the raised position and FIG. 14 shows the housing 11 in the lowered position.

Figure 14:
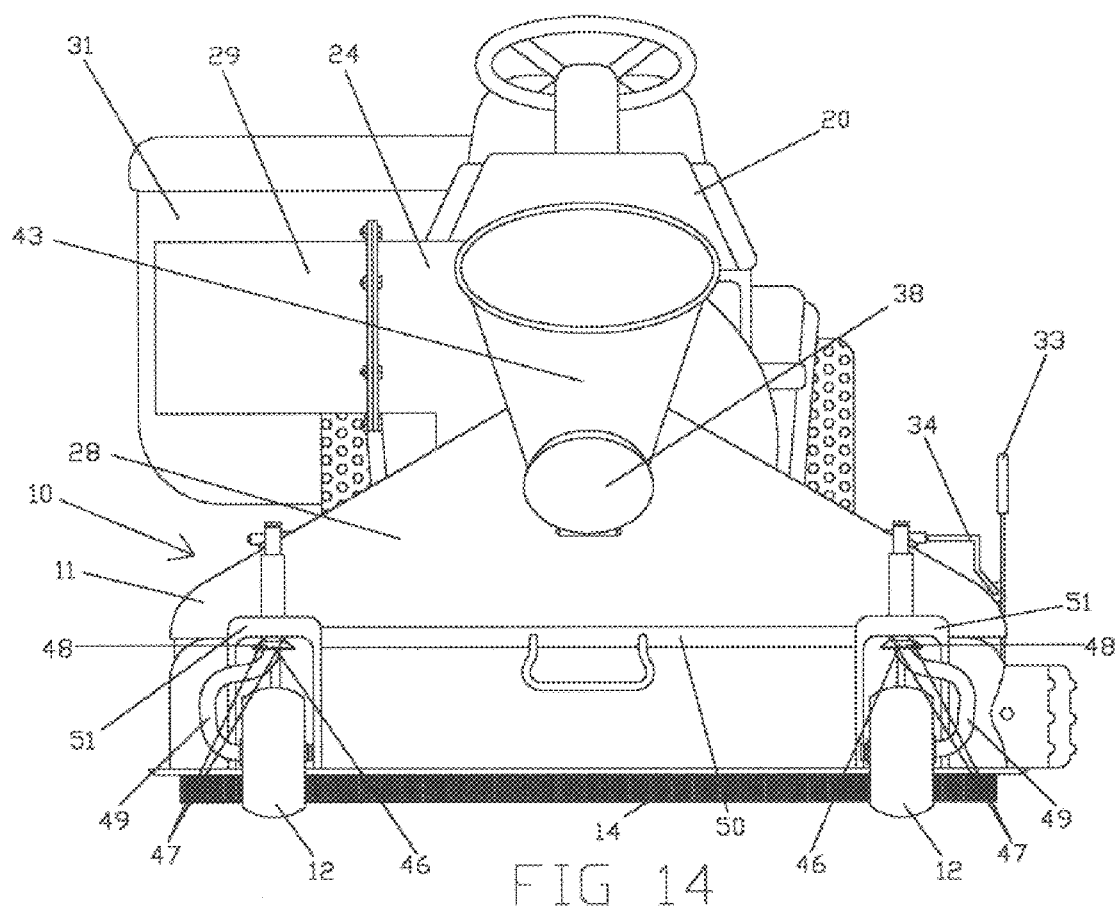
FIG. 14 is a view in front elevation illustrating the mobile sweeper apparatus of FIG. 13 with the housing shown in its lowered position as opposed to the raised position shown in FIG. 13.

When lever arm 50 is rotated downward as shown in FIG. 14, the slide cam 47 is moved horizontally through conventional linkage towards the housing between the cam follower 48 and the wheel housing 51. When lever arm 50 is rotated upwards as shown in FIG. 13, the slide cam 47 is forced between the cam follower 48 and the wheel housing 51 increasing the height of the housing from the underlying surface. This height adjustment permits adjustment for different sweeping conditions.

I claim:

1. A mobile sweeper apparatus comprising;
   a wheel supported housing to be moved over an underlying surface to be swept of debris and having a bottom opening;
   rotary brush means mounted in said housing and projecting through the bottom opening of said housing for sweeping up debris from said underlying surface;
   drive means connected for rotatably driving said brush means;
   a vacuum fan with shredder means mounted in said housing and communicating through a vacuum chute with said bottom opening for drawing in, shredding and discharging debris swept up by said brush means;
   a damper valve plate disposed in said vacuum chute between said brush means and vacuum fan and operable for closing off said vacuum chute; and
   a normally closed vacuum port positioned on said vacuum chute between said damper valve plate and said vacuum fan with shredder means for connecting a vacuum conduit to said port for vacuum communication with said fan.

2. The mobile sweeper apparatus of claim 1, wherein said vacuum conduit is a vacuum hose for vacuuming up debris.

3. The mobile sweeper apparatus of claim 1, wherein said vacuum conduit is a funnel chute for inserting debris to be shred by said fan with shredder means.

4. The mobile sweeper apparatus of claim 1, including attachment means for attaching said housing to a motorized vehicle for moving said housing, and said drive means including a power take-off from said motorized vehicle.

5. The mobile sweeper apparatus of claim 4, wherein said power take-off includes a belt drive with a spring loaded belt tensioning pulley.

6. The mobile sweeper apparatus of claim 1, wherein said rotary brush means includes parallel counter rotating brushes whereby debris is swept upwardly between said brushes.

7. The mobile sweeper apparatus of claim 1, wherein said rotary brush means includes thatching tines for thatching.

8. The mobile sweeper apparatus of claim 1, including height adjustment means for adjusting the height of said housing above said underlying surface.

* * * * *